United States Patent [19]

Sato et al.

[11] 4,217,050
[45] Aug. 12, 1980

[54] PHOTOGRAPHIC CAMERA WITH AN IMAGE OF EXPOSURE CONDITION INDICIA VISIBLE THROUGH A VIEW-FINDER THEREOF

[75] Inventors: Yasuhisa Sato; Akira Tajima, both of Kawasaki; Yukiharu Ono, Yokohama, all of Japan

[73] Assignee: Canon Kabushiki Kaisha, Tokyo, Japan

[21] Appl. No.: 822,253

[22] Filed: Aug. 5, 1977

[30] Foreign Application Priority Data

Aug. 12, 1976 [JP] Japan ................................. 51-108289

[51] Int. Cl.² ...................... G03B 13/06; G03B 17/20
[52] U.S. Cl. .................................. 354/225; 352/171; 354/289
[58] Field of Search ............... 354/219, 224, 225, 152, 354/155, 53–57, 199–201, 166, 289; 352/171

[56] References Cited

U.S. PATENT DOCUMENTS

| | | | |
|---|---|---|---|
| 3,188,931 | 6/1965 | Koehler et al. | 354/199 |
| 3,524,380 | 8/1970 | Yamada | 354/224 |
| 3,975,750 | 8/1976 | Yoshino et al. | 354/225 |

FOREIGN PATENT DOCUMENTS 1129159 10/1968 United Kingdom ..................... 354/225

Primary Examiner—John Gonzales
Attorney, Agent, or Firm—Toren, McGeady and Stanger

[57] ABSTRACT

An optical system for forming a view-finder image in combination with an image of exposure condition indicia as applied to a cinematographic camera includes a first image plane at which a focusing screen lies with the exposure condition indicia located at a desired large distance from the finder field of view, and a prism positioned ahead of a second image plane at which both the images are erected, and oriented so that the image of the indicia can be seen immediately adjacent the finder field of view by a photographer looking through an ocular of the system.

3 Claims, 6 Drawing Figures

PHOTOGRAPHIC CAMERA WITH AN IMAGE OF EXPOSURE CONDITION INDICIA VISIBLE THROUGH A VIEW-FINDER THEREOF

BACKGROUND OF THE INVENTION

This invention relates to photographic and cinematographic cameras, and more particularly to an optical system for providing an image of exposure condition indicia such as an adjusted value of the diaphragm of the objective lens in or at the image field of a reflex finder for the camera.

The presently available photographic and cinematographic cameras generally take on the exposure condition display to an increased number of exposure condition indicia for adjustment of the camera and in checking the actual voltage of an electrical power source or battery. This array of exposure condition indicia is required to lie in or near the focusing plane of the reflex finder optical system, or otherwise an image of the indicia will suffer a certain lack of sharpness as the finder optical system is designed so that a sharp image of the object area intended to be photographed can be seen at the focusing plane by the photographer looking through an ocular of the finder. Although it is desired that the indicia be located as close the object area as possible, the limitation of availability of a space which an exposure condition indicia display system is intended to occupy lead to a high possibility of requiring a large distance therebetween. If so, the image of the indicia will be seen far away from the field of view of the finder, thereby it being made more difficult for the photographer looking through the finder to read off the displayed values of the indicia with simultaneous performance of picture framing.

The main object of the present invention is to provide an optical system which enables an array of exposure condition indicia to be located at a desired large distance from a view-finder image, while nevertheless permitting an image of the indicia to be seen immediately adjacent the field of view of the finder by the photographer looking through the finder.

In one embodiment of the present invention as applied to a cinematographic camera having a reflex finder in which a beam of light forming a finder image is first focused at a plane before reaching the photographer's eye looking through an ocular of the finder, as the indicium array is positioned in or near the focusing plane at a long distance from the finder image field, use is made of light-deflecting means arranged in the path of light rays coming from the indicia, and oriented so that an image of the indicia can be seen immediately adjacent the field of view of the finder.

DESCRIPTION OF THE PREFERRED EMBODIMENTS

Figure 1:
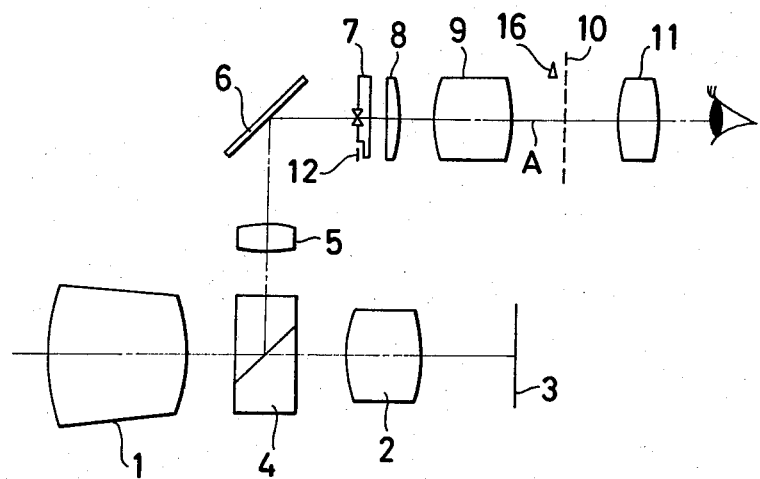
FIG. 1 is a longitudinal sectional view showing one embodiment of the present invention applied to a cinematographic camera.

Referring to FIG. 1, there is shown one embodiment of an optical system for providing an image of exposure condition indicia adjacent an image field of a finder for a cinematographic camera. The camera includes an objective lens of the zoom type consisting of an afocal front part 1 for zooming and a rear part 2 and through which a beam of light forming an image of a scene to be photographed passes to an exposure plane 3 of photographic film, the latter being intermittently advanced to take a series of picture frames. Positioned in a space between the front and rear parts 1 and 2 of the zoom objective is a beam splitter 4 with its half-mirrored surface disposed to split off a fraction of the aforesaid beam and to direct the aforesaid fraction sideways through the interior of the beam splitter 4 toward an objective lens 5 constituting part of a finder optical system. A beam of light emanating from the finder objective lens 5 is reflected by a mirror 6 onto a focusing plate 7 where an image of the scene area intended to be photographed is formed. The focusing plate 7 has a bi-prism located at the center of the area of a framing aperture thereof. Light from the image on the focusing plate 7 is radiated rearward through a field lens 8 into an image erecting lens 9, so that an erected image of the scene area is formed at a second image plane 10 shown by a dashed line and can be seen by the photographer's eye looking through an ocular 11.

Figure 2:
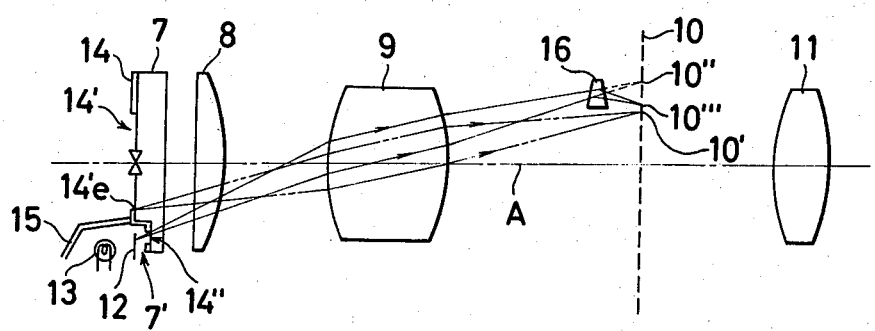
FIG. 2 is a diagram of geometry showing the effect of the prism of FIG. 1 on the location of an image of exposure condition indicia.

According to the present invention, there is provided a light-deflecting means in the form of a trapezoid prism 16 positioned ahead of the second image plane 10 and away from the path of the finder image forming light beam and oriented so that an image of exposure condition indicia can be seen immediately adjacent the field of view of the finder by the photographer's eye, despite of the fact that the exposure condition indicia 12 are located at a relatively long distance from the framing aperture area on the focusing plate 7, as can be seen in more detail in FIG. 2, where the framing aperture area is indicated at 14' as provided through a framework 14 contiguous to the front screen surface of the focusing plate 7. In order to accommodate an array of exposure condition indicia displayed on a readout member 12 in a common plane either exactly or nearly coincident with the focusing screen of the plate 7, a space 7' of necessary dimensions is formed as a cutout of the focusing plate 7, in conformity of which the framework 14 is modified at a bottom portion thereof. This modified portion is provided with an aperture 14" of rectangular area defining a field of view for the indicium array 12 and spaced apart from the framing aperture area 14' by a distance long enough to permit satisfactory operation of a display system including a lamp 13 as an illumination light source positioned behind the readout member 12. A light-shield wall 15 is provided to prevent light of the energized lamp 13 from entering the finder optical system.

Figure 3:
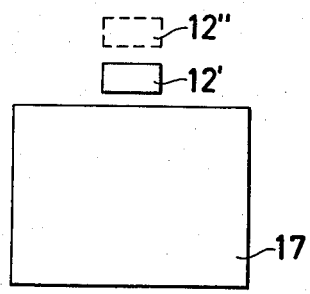
FIG. 3 is a plan view of the finder field of view with the area of a view of the exposure condition indicia of FIG. 2 shifted by the prism of FIG. 2.

As light rays emerging from an object point 14'e on the focusing screen 7 at the lower lateral edge of the framing aperture area 14' will be focused by the field lens 8 and the image erecting lens 9 of convex configuration to an image point 10' on the opposite side of an optical axis A of the finder optical system to that containing the object point 14'e, the trapezoid prism 16 is disposed with its bottom surface facing the optical axis A and arranged in the path of a beam of light forming an image of the indicium array 12 so that light rays emerging from an object point on the indicium array 12 in axial alignment with the upper edge of the aperture area 14" will be focused by the field lens 8 and the convex lens 9 to an image point 10" as shifted in radial direction toward the optical axis A from a point 10''' at which an image of that object point would be otherwise formed because of the lack of the prism 16, thereby the image of the indicia 12 can be seen by the photographer's eye at a location 12' closer the image field 17 of the finder than that 12" otherwise resulted by no use of the prism 16 as shown in FIG. 3. It is to be noted here that this prism 16 may be so dimensioned that the image of the indicia 12' appears in the view-finder image 17. It is, however, preferred that these two images 12' and 17 are made separate from each other as shown in FIG. 3 by as short a distance as possible. It is further preferred that the prism 16 is made away from the path of a light beam forming the view-finder image 17.

Figure 4:
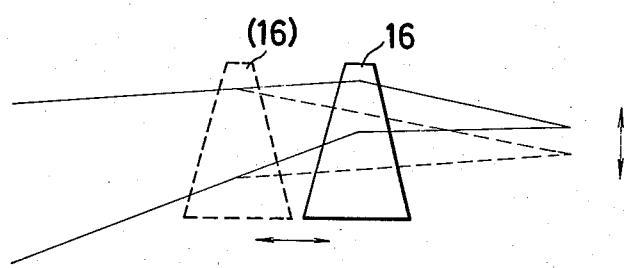
FIG. 4 is a sectional view showing a fine adjustment aspect of the prism of the invention.
Figure 5:
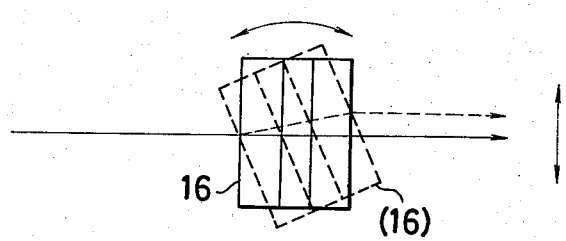
FIG. 5 is a top view showing another fine adjustment aspect of the prism of the invention.

The use of such prism gives rise to an additional advantage that, as it is practically impossible to manufacture a production run of finders while accurately locating the exposure condition indicium display structure in position, the resulting error can be compensated for by adjusting the position of the prism to establish proper setting of the indicium image field relative to the finder field of view. For example, as shown in FIG. 4, the prism may be moved by suitable position adjusting means to effect a corresponding vertical movement of the indicium image field as viewed in FIG. 3. If a horizontal movement of the indicium image field is to be made, the prism may be turned about an axis perpendicular to the optical axis A. To facilitate accurate control of location of the indicium image field, the light-deflecting means may be constructed in the form of two prisms, one of which is identical in function to the prism 16, and another prism which is adapted to perform fine adjustment of the position of the indicium image field either in the vertical or in the horizontal direction.

Figure 6:
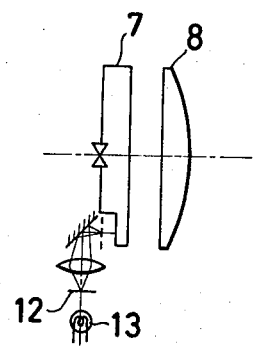
FIG. 6 is a schematic sectional view of an example of an illumination light arrangement for projecting an image of the exposure condition indicia onto the focusing plane of the finder optical system of FIGS. 1 and 2.

This invention has been described in detail with particular reference to a preferred embodiment thereof, but it will be apparent that variations and modifications can be effected within the spirit and scope of the invention as described hereinabove. For example, in the above described embodiment, the exposure condition indicia 12 are arranged close the focusing plane 7, but may be varied in position to lie in or near the second image plane 10 with simultaneous variation of the position of the prism 16 as in a space between the image plane 10 and the ocular 11. Alternately, as shown in FIG. 6, an additional supplementary optical element or lens element may be employed to create a conjugate plane to the first image or focusing plane 7 at which the indicia 12 are arranged.

What is claimed is:

1. An information display system for a photographic camera comprising:
   a photographic lens having a front lens group;
   light-reflecting means arranged behind said front lens group;
   a finder optical system facing said light-reflecting means and having a front image plane, a focusing means arranged on the front image plane, an imaging lens, a rear image plane and an ocular for observing said rear image plane in this order;
   data indicating means for supplying data on said front image plane; and
   refracting means positioned between said imaging lens and said rear image plane for shifting an image of said data on said rear image plane toward the optical axis of said finder optical system.

2. A system according to claim 1, wherein said refracting means is a prism.

3. An information display system for a photographic camera comprising:
   a photographic system;
   a view finder system optically coupled to said photographic system and including a front image plane, an imaging lens means and an ocular in this order;
   information indicating means for projecting information beam through said imaging lens means and for forming visible information; and
   a prism positioned between said imaging lens and said rear image plane for deflecting said information beam into the visual field.

* * * * *